Aug. 15, 1961     H. S. MORTON     2,996,564
DEFERRED ACTION BATTERY
Filed April 30, 1953                                 2 Sheets-Sheet 1

INVENTOR
HAROLD S. MORTON

BY
ATTORNEYS

Aug. 15, 1961 H. S. MORTON 2,996,564
DEFERRED ACTION, BATTERY
Filed April 30, 1953 2 Sheets-Sheet 2

INVENTOR
HAROLD S. MORTON

BY
ATTORNEYS

United States Patent Office 2,996,564
Patented Aug. 15, 1961

2,996,564
DEFERRED ACTION BATTERY
Harold S. Morton, Takoma Park, Md., assignor to the United States of America as represented by the Secretary of the Navy
Filed Apr. 30, 1953, Ser. No. 352,191
11 Claims. (Cl. 136—90)

This invention relates generally to batteries, and more particularly to an improved deferred action battery for use with radio proximity fuzed projectiles and the like.

One of the major problems in a deferred action battery for use in rotating types of projectiles is that of "battery noise," that is, random fluctuations in voltage and/or current which obscure the variations to be measured in a circuit in which the battery is being used.

The uniform distribution of the electrolyte to all the cells in the battery is a necessary condition to minimize battery noise. Other conditions include good mechanical rigidity of the battery, and non-fluctuating electrolytic short-circuits if such short-circuits are necessary for the purpose of equalizing the distribution of electrolyte to the several cells of the battery. In deferred action batteries as constructed up to the present, a plurality of small apertures has been provided in the plates for transferring the electrolyte from cell to cell.

It is one of the objects of this invention to minimize noise by firmly embedding the inner and outer ends of the plates in a supporting structure of plastic material, to assure a strong and rigid battery.

A further object of this invention is to reduce battery noise by feeding the electrolyte to the individual cells from the outside periphery of the battery, and firmly sealing the inside edges of the cells so that the possibility of sudden variations in the impedance of electrolytic short-circuits will be practically eliminated.

Still other objects of the invention are to provide a deferred action battery in which the electrolyte is uniformly distributed to all of the cells, one in which there is good mechanical rigidity of the component parts, and one which has provision for non-fluctuating electrolytic short-circuits for the purpose of equalizing the distribution of electrolyte to the individual cells of the battery.

A still further object of the invention is to provide a unique deferred action battery for use in radio proximity fuzes which is easy to manufacture, compact, and reliable and efficient in operation.

Other objects and many of the attendant advantages of this invention will be readily appreciated as the same becomes better understood by reference to the following detailed description when considered in connection with the accompanying drawings wherein.

According to the invention, a cylindrical deferred action battery is provided in which the electrolyte, contained in a breakable ampule, is conducted to the individual cells of the battery by distribution ducts located in the marginal edge of the periphery of the battery container. These ducts may be either straight and extend longitudinally of the battery, or a single duct, of helical shape, may be provided. Passageways are provided from the distribution ducts to the individual cells so that the electrolyte can flow therefrom into the individual cells contained in the battery.

The breakable ampule, containing the electrolyte before activation of the battery, is mounted in the center thereof as in known designs. The electrolyte, upon breakage of the ampule, is prevented from entering the individual cells at the "top" or inside of the battery plates. The only paths by which the electrolyte can be fed to the individual cells, in one embodiment of the invention, are through the distribution ducts provided in the container. These distribution ducts are located at the outer periphery of the battery. The electrolyte reaches each of the individual cells by flowing through the distribution ducts and separate passageways connecting each cell to the distribution ducts.

Air in the individual cells will be compressed as the liquid enters the cells, as there is no place near the center of the battery for said air to escape from the cells. However, suitable means can be provided for discharging the air from the distribution ducts and cells into a receiving chamber. The air enters into the receiving chamber through an opening at or near the axis of rotation of the battery so that the last cell that is filled with electrolyte will not trap substantially more air than the first. If no receiving chamber is provided for the air in the last cells which are filled with electrolyte, then the volume of space in these last cells can be made greater than that of the first ones filled with electrolyte so that there will be an equalization of the filling of the individual cells along the length of the battery.

Figures 1, 2:
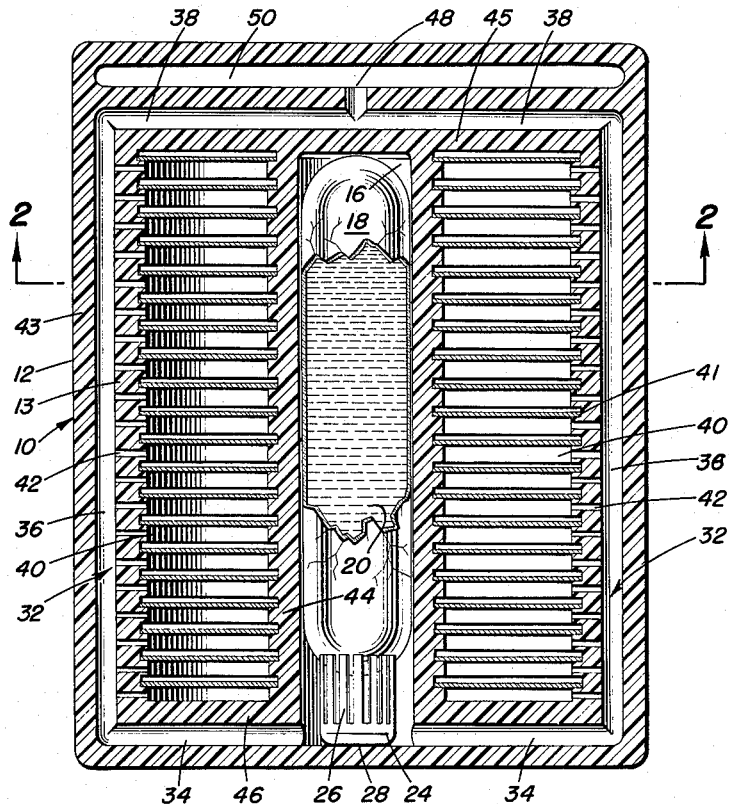
FIG. 1 is a longitudinal section, partly in elevation, of one embodiment of the deferred action battery, embodying the features of the invention.
FIG. 2 is a cross-section on line 2—2 of FIG. 1.

Referring now to FIGS. 1 and 2 of the drawings, in which there is illustrated one embodiment of the invention, a deferred action battery 10 including a cylindrical housing 12 has a support 13 contained therein which supports the individual cells that constitute the battery.

Both the housing 12 and the support 13 contained therein can be formed of a suitable plastic material. In the center of the support 13 there is provided a cylindrical chamber 16 for containing a breakable ampule 18 having an electrolyte 20 therein. This ampule 18 is supported by a spring-like element 24 having a plurality of fingers 26 provided at one end. At the base 28 of the spring-like element 24 there is provided a breaker element (not shown) which is utilized for breaking the ampule 18 upon the setback of a projectile (not shown) which is fuzed with an electrically operated fuze containing the battery.

Upon breakage of the ampule 18, the electrolyte 20 flows through a plurality of distribution ducts (only two of which are shown), such as 32. These ducts may be divided into sections 34, 36, and 38. Sections 34, and 38 of distribution ducts 32, are arranged transversely to the longitudinal axis of the battery 10 while sections 38 thereof are arranged in parallel to the longitudinal axis of the battery 10.

Between the duct sections 34 and 38, and sections 36 and the cylindrical opening 16 in housing 12, there are provided, in support 13, a plurality of vertically stacked identical cells 40 each having a pair of electrode plates 41 for receiving therebetween the electrolyte from the distribution duct sections 36. Support 13 comprises a cylindrical wall 43 and a cylindrical column 44, enclosed at the top and base as at 45 and 46, respectively. A plurality of electrode plates 41 are placed in the space between wall 43 and column 44, and members 45 and 46, so that the space between each two plates 41 defines a cell 40. Each individual cell 40 is connected to duct sections 36 by means of passageways 42. From duct sections 38 there is provided a channel or passageway 48 which is connected to a reservoir 50 to receive any excess electrolyte and/or air trapped in the individual cells 40 or in the distribution duct sections 34, 36, and 38.

Figure 3:
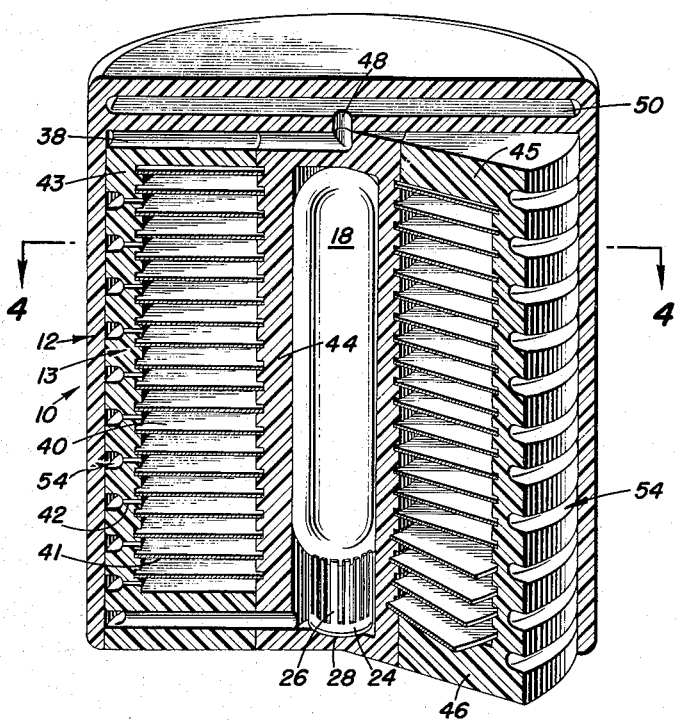
FIG. 3 is a perspective view, partly in longitudinal section, of a second embodiment of the invention.
Figure 4:
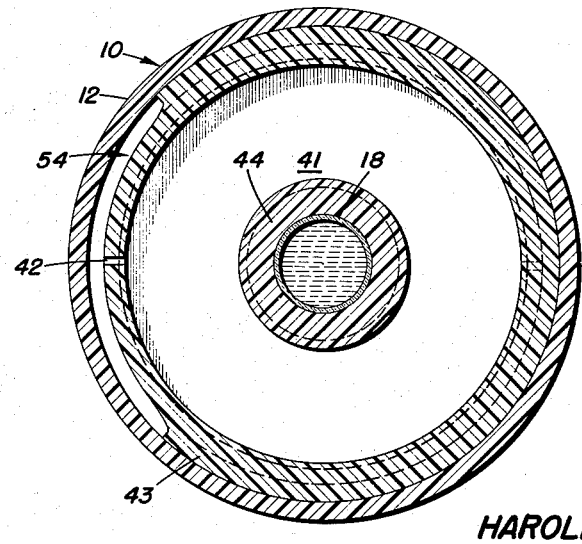
FIG. 4 is a cross-section taken on line 4—4 of FIG. 3.

Referring now to FIGS. 3 and 4 of the drawings, there is shown a second embodiment of the battery 10 having parts similar to those illustrated in the first embodiment of the invention shown in FIGS. 1 and 2, with the exception that a single distribution duct 54 is provided for distributing the electrolyte to the cells 40. This distribution duct is located at the periphery or outer surface of wall 43, of support 13, and adjacent to housing 12 and is in the form of a helix, as shown in FIG. 3. When a helical distribution duct is utilized, this duct can be cut around the outside of the wall 43 in which the battery plates are embedded. At equal intervals along this helix, passageways or openings 42, are provided to the successive cells 40. A tight fitting cylindrical housing, such as the housing 12 of the first described embodiment, can be slipped over the outside of support 13 and then be permanently bonded thereto to convert the open groove into a continuously closed distribution duct.

It is to be noted that the distribution ducts 32, illustrated in FIGS. 1 and 2, and the distribution duct 54, illustrated in FIGS. 3 and 4, constitute an electrolytic short-circuit path for the battery 10. Since the cross-section of the battery 10 can be small, the percentage of total capacity sacrificed to secure equalization of the electrolyte distribution in the battery can be reduced to a reasonable value. Since the required life of deferred action batteries of this type is generally measured in seconds, any losses in capacity can generally be tolerated. It is to be further noted that the short-circuit from cell to cell, in the embodiments of the invention illustrated, passes through a much longer path than the short-circuits in conventional batteries having holes or apertures perforated in the battery plates for the passage of the electrolyte from one individual cell to another.

It is known, for some purposes, that fast activation of the battery is required and that the active life thereof is short. In such cases, a straight, short duct of large diameter as required can be utilized. A distribution duct of this type produces larger short-circuit losses but these are compatible with short life. For other purposes, a slow activation of the battery may be required, resulting in delayed completion of a circuit through the battery, which is very desirable. In order to achieve this effect, the distribution duct should be made longer.

By lengthening the distribution duct, the activation time is increased and the impedance of the short-circuit across the battery is likewise increased so that the losses are reduced. This becomes desirable when longer battery life is required for use in proximity fuzed projectiles that are to have long times of flight. Slow activation and longer life of the battery are mutually consistent requirements which can both be served by providing a long feeding distribution duct and one of small cross-section.

It is to be further pointed out that a series of distribution ducts can be provided parallel to the longitudinal axis of the battery 10 and spaced around the outer periphery of the battery. These distribution ducts can be connected in series so that the electrolyte flows down one distribution duct and back through the next distribution duct and so on until all distribution ducts are filled. At equal distances along this path, passageways, or openings, such as 42, can be provided into the successive cells until provision has been made for filling all of the cells.

In operation, upon the breakage of the ampule 18, due to setback of the fuzed projectile in which the battery 10 is utilized, the electrolyte 20 contained therein, due to centrifugal and inertial force, is caused to flow in the distribution ducts 32 or 54. The electroylte flowing in distribution ducts 32 and 54 is distributed through passageways 42 to the individual cells 40. Any air that is trapped in either the distribution ducts 32 or 54, as well as in the individual cells 40, is forced into the receiving chamber or reservoir 50.

In the event that the air trapped in the cells 40 cannot escape therefrom, sufficient space can be provided therein for the air trapped and compressed by the electrolyte when it enters the individual cells 40. If space is not provided in the individual cells for receiving the trapped air, means can be provided, such as suitable passageways, for emptyng the air from the individual cells or from the distribution ducts. In the case where no receiving chamber or reservoir 50 is provided, then the volume of the last cells to receive the electrolyte 20 can be increased so as to equalize the amount of electrolyte that will be contained in the cells last filled in order to equalize the filling of the cells along the length of the battery 10.

The total output voltage of the battery 10 will depend upon the number of individual cells connected in series. The distribution ducts, such as 32 or 54, connected to the several cells 40 do constitute a partial short-circuit, but the cross-section of the passageways 42 into the several cells is so small, compared with the area of the plates 41, that their detrimental effect is negligible. The apertures in the plates of conventional deferred action batteries also constitute a partial short-circuit which has not been found to interfere with the proper operation of the battery.

Obviously many modifications and variations of the present invention are possible in the light of the above teachings. It is therefore to be understood that within the scope of the appended claims the invention may be practiced otherwise than as specifically described.

What is claimed is:

1. A deferred action battery, comprising, a housing, a support contained within said housing and having a chamber therein, a frangible ampule containing an electrolyte, said ampule being located in said chamber, said support having a plurality of cells therein, each cell having a pair of electrode plates for receiving electrolyte therebetween upon breakage of said ampule, a distribution duct located in said support and connecting said chamber in said support with each individual cell, said distribution duct being helical in shape and located between said housing and said support, and means for receiving any excess electrolyte or gaseous medium trapped within said housing.

2. A deferred action battery, comprising, a housing, a support contained within said housing and havng a chamber therein, a frangible ampule containing an electrolyte, said ampule being located in said chamber, said support having a plurality of cells therein, each cell having a pair of electrode plates for receiving electrolyte therebetween, a distribution duct in said support for distributing said electrolyte to each cell in said support upon breakage of said ampule, said distribution duct being located between said housing and support and having the major portion thereof arranged parallel to the longtudinal axis of said support and housing, said distribution duct having at least one passageway communicating with each cell, and means for receiving any excess electrolyte or gaseous medium trapped within said housing.

3. A deferred action battery, comprising, a housing, a support contained within said housing and having a chamber therein, a frangible ampule containing an electrolyte, said ampule being located in said chamber, said support having a plurality of cells therein, each cell having a plurality of plates for receiving electrolyte therebetween, a distribution duct formed in the support for distributing said electrolyte to each cell, said distribution duct including a plurality of sections arranged parallel to the longitudinal axis of said battery and spaced around the outside periphery of said support, said sections being connected in series so that said electrolyte flows down one section and back through the next section and down and back through succeeding sections until all sections of said distribution duct are filled, said distribution duct having at least one passageway to each cell, and means for receiving any excess electrolyte or gaseous medium trapped within said housing.

4. A deferred action battery, comprising, a housing, a support within said housing, said support having a chamber extending along its longitudinal axis, a frangible ampule containing an electrolyte, said ampule being located in said chamber, said support having an outer wall spaced from the wall of said chamber, a plurality of cells located between said chamber and said outer wall, each cell having a pair of electrode plates for receiving electrolyte therebetween, a distribution duct connecting said chamber with each of said cells in said support, said distribution duct being located along said outer wall and along the bottom and top walls of the support, and means communicating with said duct for receiving any excess electrolyte or gaseous medium trapped within said housing.

5. A deferred action battery, comprising, a housing, a support within said housing, said support having a chamber extending along its longitudinal axis, a frangible ampule containing an electrolyte, said ampule being located in said chamber, said support having an outer wall spaced from the wall of said chamber, a plurality of cells located between said chamber and outer wall, each cell having a pair of electrode plates for receiving electrolyte therebetween, a distribution duct connecting said chamber with each of said cells in said support, said distribution duct being located along said outer wall and along the bottom and top walls of said support, and a reservoir formed within said housing and communicating with said duct for receiving any excess electrolyte or gaseous medium trapped within said housing.

6. In a deferred action battery, a support having walls and a chamber therein, a frangible ampule in said chamber in said support and containing an electrolyte, a plurality of cells, each cell including a pair of electrode plates, said walls mounting said cells, a distribution duct formed in the outer surface of said support and communicating with said chamber, and passageways communicating between said duct and said cells, said duct and passageways leading electrolyte to said cells upon breakage of said ampule.

7. In a deferred action battery having a plurality of cells and a frangible ampule containing an electrolyte, a support for said cells and ampule, said support including a wall, and a central column defining a chamber for receiving said ampule, said cells being supported between said wall and central column, passageways in said wall and communicating with said cells, and a distribution duct in said support and communicating between said chamber and passageways.

8. A deferred action battery, comprising, structure containing a frangible ampule having an electrolyte therein and at least one annular cell surrounding said ampule, said cell having a pair of electrode plates for receiving therebetween said electrolyte upon breakage of said ampule, and means for distributing said electrolyte to said cell from the outside of said structure toward the center thereof.

9. A deferred action battery, comprising, structure containing a frangible ampule having an electrolyte therein and a plurality of annular cells surrounding said ampule, each cell having a pair of electrode plates for receiving therebetween said electrolyte upon breakage of said ampule, and means for distributing said electrolyte to said cells from the outside of said structure toward the center thereof.

10. A deferred action battery comprising a housing, a support within said housing, said support having a chamber, a plurality of spaced electrode plates, the space between adjacent plates comprising a cell, a frangible ampule containing an electrolyte located in said chamber, and duct means connecting said chamber with said cells to permit electrolyte to flow thereto upon breakage of said ampule.

11. A deferred action battery as recited in claim 10, including additionally means for receiving excess electrolyte or air trapped in said cells upon the activation of said battery.

References Cited in the file of this patent

FOREIGN PATENTS

| | | |
|---|---|---|
| 453,136 | Canada | Dec. 7, 1948 |
| 453,135 | Canada | Dec. 7, 1948 |